Oct. 19, 1965   L. SANTOMIERI   3,212,683
PULVERULENT MATERIAL DISPENSING DEVICE
Filed June 5, 1963
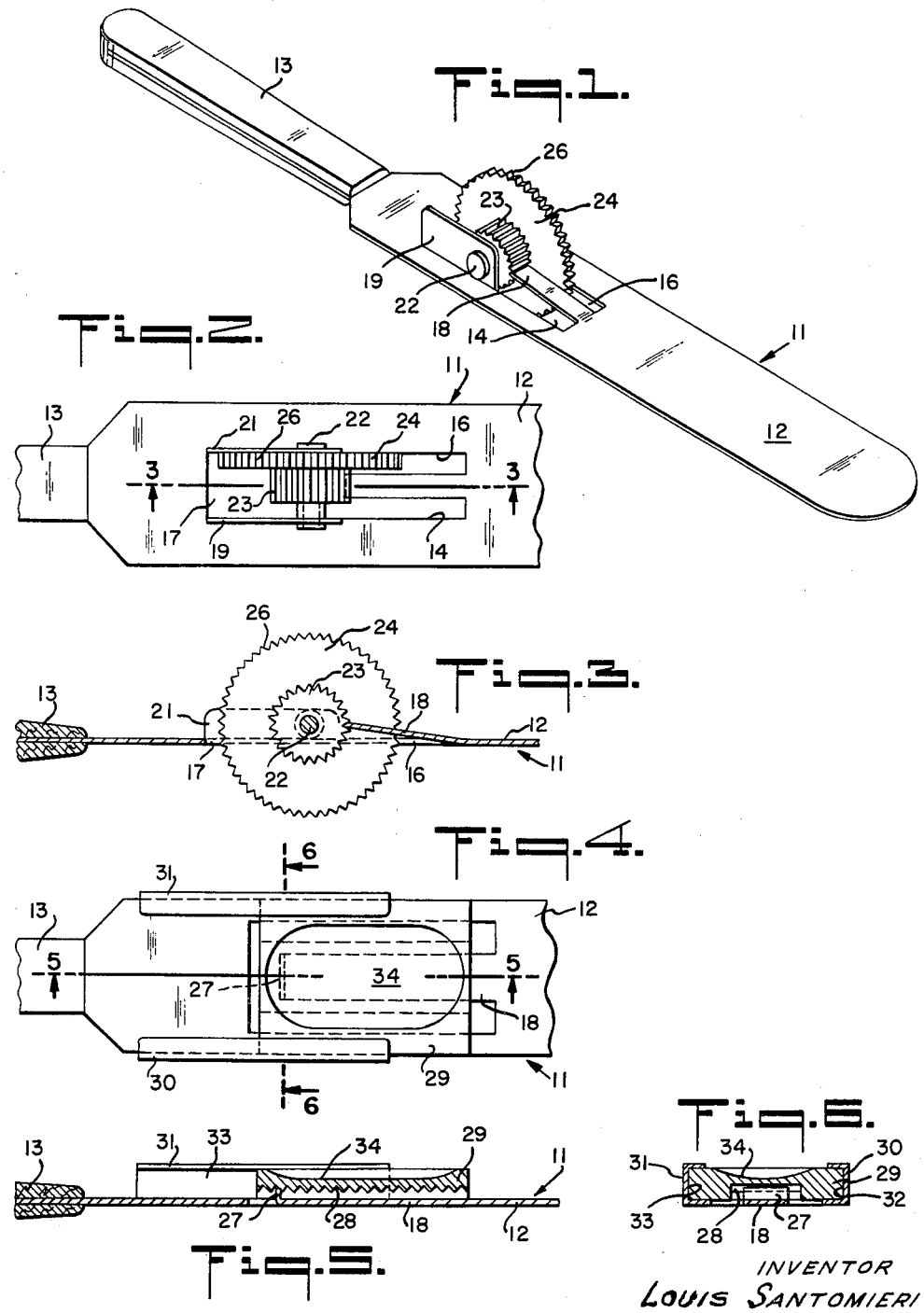
INVENTOR
LOUIS SANTOMIERI
BY
Gardner & Zimmerman
ATTORNEYS United States Patent Office 3,212,683
Patented Oct. 19, 1965

3,212,683
PULVERULENT MATERIAL DISPENSING
DEVICE
Louis Santomieri, 1176 Valle Vista, Vallejo, Calif.
Filed June 5, 1963, Ser. No. 285,744
7 Claims. (Cl. 222—201)

This invention relates to devices for metering various materials in powdered or granulated form, and is particularly directed to a device of this type which dispenses minute metered quantities of pulverulent material in response to mechanically generated vibrations.

In chemical laboratories, pharmacies, and the like, it is frequently necessary to accurately measure powdered and granulated substances, in both gross and minute amounts, in the preparation of various chemical compositions, pharmaceuticals, etc. Commonly, analytical scales are utilized for the actual measurement of a quantity of pulverulent material. However, spatulas, measuring spoons, scoops, etc., are employed to dispense the material to the scales for weighing. Gross amounts of material are readily dispensed by these implements to bring the scales to a nearly balanced condition. Thereafter, very minute quantities of material of the order of several granules, must be dispensed to the scales to precisely balance same. Substantial difficulty is of course encountered in dispensing such minute quantities of material with the conventional implements noted above. Therefore, various modified forms of dispensing implements have been devised wherein vibrations are imparted to material supported by the implement to induce flow of the material therefrom in a relatively more controllable manner. However, existing vibratory dispensing implements still leave much to be desired in the dispensing of very minute quantities of pulverulent material inasmuch as these implements have heretofore employed electromagnetic vibrators or equivalent vibrator means which impart vibrations to the material in a continuous manner. Although these continuous vibrations contribute to the ease with which the material is dispensed from the implement, and in so doing, afford increased controllability, the amount of material dispensed is still dependent almost entirely upon the angle of inclination at which the implement is held. Accordingly, extreme caution must be exercised in appropriately manipulating a continuous vibratory dispensing implement to dispense a minute quantity of material.

It is therefore an object of the present invention to provide an improved dispensing implement for pulverulent materials which features means for the selective generation of single or plural mechanical impulses to induce vibrations in the implement in a highly controllable manner conductive to the dispensing of pulverulent materials in minute quantities.

Another object of the invention is the provision of a dispensing implement of the class described which is suited to both gross and minute measurement applications.

Still another object of the invention is the provision of a dispensing implement of the class described wherein the vibration inducing impulses are generated by snap action.

It is a further object of the invention to provide a vibratory dispensing implement which is extremely simple and economical in construction, and which is characterized by ruggedness and long life.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawings and description may be adopted within the scope of the invention as set forth in the claims.

FIGURE 1 is a perspective view of a pulverulent material dispensing implement in accordance with the present invention, the implement being embodied as a spatula for purely exemplary purposes.

FIGURE 2 is a fragmentary plan view of this dispensing implement on an enlarged scale.

FIGURE 3 is a sectional view taken at line 3—3 of FIGURE 2.

FIGURE 4 is a fragmentary plan view of a modified form of dispensing implement employing an alternative form of vibration impulse generating means.

FIGURE 5 is a sectional view taken at line 5—5 of FIGURE 4.

FIGURE 6 is a sectional view taken at line 6—6 of FIGURE 4.

Referring now to the drawing, there will be seen to be provided a pulverulent material dispensing device which in its broader aspects includes a body extending to a handle portion at one end while being adapted at the other end for the support of pulverulent material either directly or through the intermediary of a receptacle rigidly attached to the body. In the case of a spatula the material is directly supported upon the opposite end of the body from the handle. However, it will be appreciated that the material may as well be supported within a scoop, the bowl of a spoon, or an equivalent receptacle carried at such end of the body. Irrespective of the specific configuration of the pulverulent material support portion of the device, the present invention provides for the dispensing of the material therefrom in readily controllable minute quantities. In this regard the body of the device carries manually actuated means for the selective application of single or plural mechanical impulses to the body, as desired, to induce vibrations therein which are in turn imparted to pulverulent material supported upon the body, or in a receptacle associated therewith. The vibration induced by each impulse "jiggles" a very minute quantity of material, even as small as a single granule, from the dispensing device. Of course, the dispensing device may also be employed in the conventional manner to dispense gross amounts of pulverulent material.

Considering now the dispensing device in greater detail as to structure, and referring to FIGURES 1–3, the body of the device is indicated at 11, in the present case, in the form of a spatula. More particularly, the body 11 is of thin, flat, elongated rectangular configuration including a broadened portion 12 for the support pulverulent material at one end which tapers into a shank or handle portion 13 at the opposite end. In the instant embodiment the impulse generating means is provided as a pawl and ratchet, the pawl being rigidly associated at one end with body portion 12 and at its free end engaging the teeth of a ratchet gear. In response to rotation of the ratchet, the pawl in traversing each tooth thereof is displaced from its normal position to thereafter resiliently snap back to its normal position and in so doing apply a vibration inducing mechanical impulse to the body. Although such a pawl and ratchet arrangement may be variously provided, the illustrated arrangement is preferred in the interests of simplicity and ease of construction. More particularly, the body portion 12 is provided with a pair of transversely spaced longitudinally extending slots 14, 16 which terminate at one end in a rectangular aperture 17. The slots and aperture thereby peripherally define a tongue or pawl 18 having one end in rigid association with body portion 12. In addition, the aperture is preferably formed by transversely slotting the body portion 12 at longitudinally spaced positions, longitudinally slotting the body portion between the transverse slots at their mid-points, and bending the regions of the body portion bounded by the slots right angularly outward. As a result a pair of transversely spaced upstanding ears 19, 21 are provided on opposite sides of aperture 17. These ears serve to journal a transverse shaft 22 to which the ratchet gear 23 is fixedly coaxially centrally secured, the gear teeth engaging the free end of pawl 18. A thumb wheel 24 is also preferably fixedly secured to the shaft to facilitate ready rotation of the shaft, and therefore of the ratchet. The thumb wheel 24 is best of relatively large diameter compared to that of the ratchet gear and offset therefrom so as to freely extend through one of the slot 16. The wheel is also advantageously peripherally serrated, as indicated at 26, or otherwise roughened to provide good traction with the thumb of a user grasping the handle portion 13. The relatively large diameter of the thumb wheel 24, moreover, facilitates the exertion of substantial leverage on the ratchet gear 23 and precisely controllable tooth by tooth rotation thereof.

Considering now a modified form of mechanical impulse generating mechanism which may be employed in dispensing devices in accordance with the present invention, reference is made to FIGURES 4–6, which depict a slide actuated impulse generating arrangement in association with the spatula body 11. In the present embodiment the pawl 18 is provided with an upstanding lip or ridge 27 at its free end. Such ridge engages transverse toothed serrations 28 in the under face of a slide plate 29 mounted upon the body for slidable translation longitudinally thereof. More particularly, guide brackets 30, 31 are provided along the opposite side edges of body portion 12 adjacent the pawl. These brackets define with the upper face of the body portion transversely recessed longitudinally extending guideways 32, 33 within which the slide plate 29 is slidably disposed. The upper surface of the plate is preferably formed with a depression 34 for receiving the thumb of a user grasping the handle portion 13. The slide plate may be consequently translated back and forth with the thumb, the teeth between the serrations 28 in the underface of the plate respectively depressing the pawl 18 in passing over the ridge 27. Subsequent to each depression of the pawl it snaps back into place as the ridge is received in a serration. Vibration inducing impulses are responsively applied to the body which, in the manner noted hereinbefore, jiggle minute quantities of pulverulent material from the body portion 12.

What is claimed is:

1. A pulverulent material dispensing device comprising a body having a handle portion at one end and a support portion at the other end adapted to support pulverulent material, and manually actuated means carried by said body including a resiliently movable element connected to said support portion and a manually movable member having teeth engaging said element for the selective application of mechanical impulses thereto to thereby induce vibrations therein conductive to dispensing a minute quantity of pulverulent material therefrom.

2. A dispensing device according to claim 1, further defined by said means for the selective application of mechanical impulses to said support portion comprising a resilient pawl having one end in rigid association with said support portion of said body, and the teeth of said manually movable member engaging said pawl for selectively displacing same from a normal position and permitting resilient return of the pawl to said normal position.

3. A pulverulent material dispensing device comprising a body having a handle portion at one end and a support portion at the other end adapted to support pulverulent material, manually actuated means for the selective application of mechanical impulses to said support portion comprising a pawl having one end in rigid association with said support portion of said body, and means engaging said pawl comprising a ratchet gear mounted for rotation upon said support portion of said body and engaging the free end of said pawl for selectively displacing same from a normal position and permitting resilient return of the pawl to said normal position.

4. A dispensing device according to claim 2, further defined by said manually movable member engaging pawl comprising a slide plate mounted upon said support portion of said body for translation longitudinally thereof and having transverse serrations in its undersurface, said pawl having an upstanding ridge at its free end in engagement with said serrations.

5. A pulverulent material dispensing device comprising a thin flat elongated body, said body having a pair of transversely spaced longitudinally extending slots terminating in an aperture and thereby defining a pawl, said body having transversely spaced upstanding ears on opposite sides of said aperture, a transverse shaft journalled between said ears, and a ratchet gear coaxially fixedly secured to said shaft and engaging the free end of said pawl.

6. A dispensing device according to claim 5, further defined by a thumb wheel of relatively larger diameter than said ratchet gear fixedly coaxially secured to said shaft and freely traversing one of said slots.

7. A pulverulent material dispensing device comprising a thin flat elongated body, said body having a pair of transversely spaced longitudinally extending slots terminating in an aperture and thereby defining a pawl, said pawl having an upstanding ridge at its free end, means on said body defining transversely opposed longitudinal guide-ways, and a slide plate slidably disposed in said guide-ways, said slide plate having transverse serrations in its under face engaging said ridge, said slide plate having a thumb receiving depression in its upper face.

References Cited by the Examiner

UNITED STATES PATENTS

| 18,104 | 9/57 | Rogers | 222—201 |
| 801,876 | 10/05 | Holmes | 46—192 X |
| 1,955,262 | 4/34 | Tsukamoto | 46—192 |
| 2,278,150 | 3/42 | Roscoe | 222—196 |
| 2,421,403 | 6/47 | Allen | 46—192 |
| 2,753,470 | 7/56 | Armstrong | 30—272 |
| 2,919,538 | 1/60 | Eichholz | 46—192 X |

LOUIS J. DEMBO, *Primary Examiner.*

SAMUEL F. COLEMAN, *Examiner.*